(12) United States Patent
Oh et al.

(10) Patent No.: US 8,489,095 B2
(45) Date of Patent: Jul. 16, 2013

(54) APPARATUS AND METHOD FOR PROVIDING GROUP SERVICE IN WIRELESS COMMUNICATION SYSTEM

(75) Inventors: Don-Sung Oh, Daejeon-si (KR); Seung-Chan Bang, Daejeon-si (KR); Il-Gyu Kim, Chungcheongbuk-do (KR); Hyun-Kyu Chung, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 264 days.

(21) Appl. No.: 12/870,834

(22) Filed: Aug. 29, 2010

(65) Prior Publication Data

US 2011/0143757 A1    Jun. 16, 2011

(30) Foreign Application Priority Data

Dec. 15, 2009    (KR) .................. 10-2009-0124770

(51) Int. Cl.
*H04W 4/00*    (2009.01)
(52) U.S. Cl.
USPC ............... 455/435.2; 455/404.2; 455/456.1
(58) Field of Classification Search
USPC ............... 455/435.2, 41.1, 41.2, 403, 404.2, 455/456.1, 466
See application file for complete search history.

(56) References Cited

U.S. PATENT DOCUMENTS

| 7,260,716 | B1 * | 8/2007 | Srivastava | 713/163 |
| 2005/0186954 | A1 | 8/2005 | Kenney | |
| 2007/0253376 | A1 * | 11/2007 | Bonta et al. | 370/338 |
| 2007/0288386 | A1 * | 12/2007 | Adachi et al. | 705/58 |

FOREIGN PATENT DOCUMENTS

| KR | 10-2006-0032274 A | 4/2006 |
| KR | 10-0667331 | 1/2007 |
| KR | 10-2007-0057349 A | 6/2007 |
| KR | 10-2008-0045296 A | 5/2008 |

OTHER PUBLICATIONS

Park, J.Y., and Kang, S.G., "Survey of Standardization Activities on Multicast", Electronics and Communications Trends: Information Communication Standardization Special Issue; Dec. 2007, pp. 10-23, vol. 22, No. 6; Electronics and Telecommunications Research Institute, Daejeon-si, Republic of Korea.

* cited by examiner

*Primary Examiner* — Cong Tran
(74) *Attorney, Agent, or Firm* — Kile Park Reed & Houtteman PLLC (57) ABSTRACT

A group service providing method and apparatus suitable for use in a wireless communication system. A group registration method for providing a group service to a master terminal and a slave terminal, the group registration method may comprise receiving and storing subscriber profile information of the master terminal from an associated communication network server in response to a group service registration request from the master terminal; generating a group related to the group service registration request and a group key corresponding to the generated group and transmitting to the master terminal a group generation completion message including the group key; receiving and storing subscriber profile information of the slave terminal dependent on the master terminal from the communication network server; and transmitting the group key to the slave terminal with reference to the subscriber profile information of the slave terminal.

5 Claims, 5 Drawing Sheets

APPARATUS AND METHOD FOR PROVIDING GROUP SERVICE IN WIRELESS COMMUNICATION SYSTEM

CROSS-REFERENCE TO RELATED APPLICATION

This application claims the benefit under 35 U.S.C. §119 (a) of Korean Patent Application No. 10-2009-0124770, filed on Dec. 15, 2009, the entire disclosure of which is incorporated herein by reference for all purposes.

BACKGROUND

1. Field

The following description relates to an apparatus and method for providing a group service in a wireless communication system, and more particularly, to an apparatus and method for providing a group service through a group service server and group keys in various wireless communication systems and controlling a function of a wireless terminal that uses the provided group service.

2. Description of the Related Art

With the development of high-speed wireless communication systems such as the 3rd Generation Partnership Project Long Term Evolution (3GPP LTE), Wibro, and wireless local access network (WLAN), users can easily access networks through wireless terminals. Individual users form several groups of terminals, and then perform various tasks such as exchanging contents or communication through a messenger within their group of terminals, or are provided with a service such as location-based service within the group.

However, such group services are oriented to service providers or portal site providers, and thus it is difficult for personal users to be provided with a user-oriented group service using an active wireless terminal. For example, when a user in a given area wants to form a specific group of terminals using his/her wireless terminal, and use the user-oriented group service, all the wireless terminals in the given area need to be accommodated in the same wireless provider network. That is, when the wireless terminals to be included in the specific group access different provider networks or wireless networks in different schemes, the group of wireless terminals is not able to be formed and accordingly, the user cannot use the personal-oriented group service within the corresponding group.

SUMMARY

In one general aspect, provided is a group registration method for providing a group service to a master terminal and a slave terminal, the group registration method including: receiving and storing subscriber profile information of the master terminal from an associated communication network server in response to a group service registration request from the master terminal; generating a group related to the group service registration request and a group key corresponding to the generated group and transmitting to the master terminal a group generation completion message including the group key; receiving and storing subscriber profile information of the slave terminal dependent on the master terminal from the communication network server; and transmitting the group key to the slave terminal with reference to the subscriber profile information of the slave terminal.

The communication network server may store subscriber profile information, multicast-/broadcast information and terminal information of each of the master terminal and the slave terminal.

The group key provided to each of the master terminal and the slave terminal may be used to register and release a group corresponding to the group key and install and remove contents or a program used for a group service for the group.

The group key provided to each of the master terminal and the slave terminal may be updated, changed, and deleted according to a condition previously defined by the master terminal or the group service server.

In another general aspect, provided is a group service providing method for providing a group service to a master terminal and a slave terminal which are provided with a group key from a group service server for use of the group service, the group service providing method including: in response to a group service request from the master terminal, receiving contents related to the group service request from a content provision server; combining the received contents with the group key and valid duration information of the contents and storing the combined contents; transmitting a content download guide message to the slave terminal for downloading the contents combined with the group key with reference to terminal information of the slave terminal received from a communication network server associated with the master terminal; and in response to an ad-hoc network participation request from the slave terminal that has downloaded the contents combined with the group key according to the content download guide message, setting an ad-hoc network between the master terminal and the slave terminal that has received the combined contents.

The group service request information may include a service type, service details and corresponding content information of the group service and the content download guide message may include location information of the group key-combined contents stored in the group service server.

The transmitting of the content download guide message may include: requesting the communication network server to transmit the terminal information of the slave terminal dependent on the master terminal; receiving the terminal information of the slave terminal from the communication network server; and transmitting the content download guide message to the slave terminal with reference to the received terminal information of the slave terminal and transmitting a content download completion message to the master terminal.

In yet another general aspect, provided is a slave terminal control method by which a master terminal provided with a group key from a group service server for use of a group service controls a function of a slave terminal provided with the group key, the slave terminal control method including: transmitting terminal function control program request information to the group service server for control of the function of the slave terminal; in response to receiving a terminal function control program storage completion message from the group service server when a terminal function control program is stored according to the terminal function control program request information, receiving terminal information of the slave terminal from a communication network server associated with the slave terminal; transmitting a terminal function control program download guide message to the slave terminal with reference to the received terminal information of the slave terminal; when a download of a terminal function control program is completed in the slave terminal and a download completion message is received from the group service server, requesting the slave terminal to set up an ad-hoc network between the master terminal and the slave terminal; and controlling the function of the slave terminal though the formed ad-hoc network between the master terminal and the slave terminal.

The terminal function control program may include valid duration information of each of the group key and the terminal control function program, and the terminal function control program download guide message may contain location information of the terminal function control program stored in the group service server.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
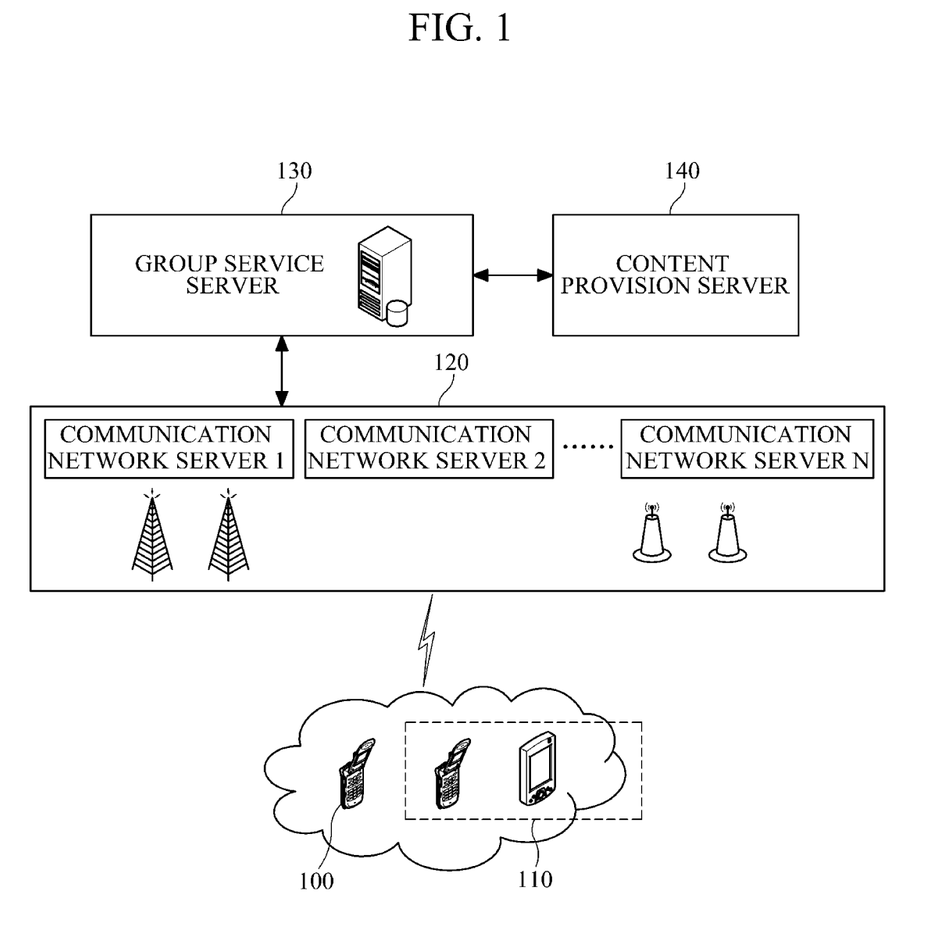
FIG. 1 is a diagram illustrating an example of a wireless communication system suitable for providing a group service.

FIG. 1 illustrates an example of a wireless communication system suitable for providing a group service.

Referring to the example illustrated in FIG. 1, the wireless communication system suitable for providing an individual-oriented group service in a wireless communication network includes a master terminal 100, a set of slave terminals 1-N 110, and a group of communication network servers 1-N 120, a group service server 130, and a content provision server 140.

The master terminal 100 and the set of slave terminals 1-N 110 are wireless terminals, for example, mobile phones and personal digital assistants. Among a group of wireless terminals 100 and 110, the master terminal 100 may be determined by compulsion or by terminal users' decision, and the rest of the wireless terminals may be accordingly determined as the slave terminals 110.

There may be one or more master terminals. In response to a group service request from a user, the master terminal 100 forms a group related to the requested group service, or control, add, and remove a function of the group. The master terminal 100 may be registered on the group service server 130. The master terminal 100 registered on the group service server 130 may control functions of the slave terminals 1-N 110 belonging to the same group as the master terminal 110, or add or remove functions to/from the slave terminals 1-N 110. However, the operation of the master terminal 100 with respect to the slave terminals 1-N 110 is not limited to the above description, and the master terminal 100 may be able to control, add, or remove functions of the slave terminals 1-N 110 belonging to a different group using a group key provided from the group service server 130. Here, the group key is generated by the group service server 130 and provided to the master terminal 100 and the slave terminals 1-N 110. The group key is utilized to register and release a corresponding group of wireless terminals and to install and remove contents or a program provided by a group service to the corresponding group of wireless terminals. The group key provided to the master terminal 100 and the slave terminals 1-N 110 may be updated, changed or deleted according to a condition previously defined by the master terminal 100 or the group service server 130.

The slave terminals 1-N 110 are connected to one or more networks to be provided with communication services. The slave terminals 1-N 110 may be registered to the group service server 130 and, after registration, may remain connected to the group service server 130 so as to be provided with a group service corresponding to a group where the slave terminals 1-N 110 belong. Accordingly, the slave terminals 1-N 110 are able to use a group key provided from the group service server 130 to register and release the corresponding group to/from the group service server 130 or to be provided with contents or programs related to the group service provided to the registered group from the group service server 130. The slave terminals 1-N 110 may be allowed to download contents related to the group service from the group service server 130 only at the locations associated with the contents.

The communication network server 120 is operable for data communication between the master terminal 100 and the slave terminals 1-N 110 over a communication network. That is, the master terminal 100 and the slave terminals 1-N 110 are connected to a communication network associated with one communication network server 120 or to several communication networks associated with a plurality of communication network servers 120, thereby performing data communication through the connected communication network(s). As such, each of one or more communication network servers 120 stores subscriber profile information, location information, multicast/broadcast service information and terminal information of the relevant master terminal 100 and/or the slave terminals 1-N 110. Accordingly, the communication network server 120 is able to provide information about a terminal in response to a group service request from the master terminal 100 or the group service server 130.

The group service server 130 is operable for providing a group service to each of the master terminal 100 and the slave terminals 1-N 110 that are connected to the communication network associated with the communication network server 130. To this end, the group service server 130 generates a group of terminals related to the group service to be provided and a group key for the generated group. Here, the group key may be used to register or release the master terminal 100 and the slave terminals 1-N 110 to/from the generated group. In addition, the group service server 130 may register and manage the master terminal 100 that can manage the group key for the generated group. Also, the group service server 130 performs data communication with the content provision server 140 to receive and store the contents to be used for the group service. Thus, the slave terminals 1-N 110 are allowed to download the contents or programs stored in the group service server 130.

In detail, the slave terminals 1-N 110 that have received the group key from the group service server 130 may use the received group key to activate contents related to the group service or they may be controlled by the received group key. When the slave terminals 1-N 110 are out of a specific area or a given period of time has elapsed, the group key becomes ineffective and the function of the group key allowing the use of contents related to the group service or the operation control becomes invalid, and thus the group service by the group key is released.

For example, a mobile phone of a manager of a theater may be a master terminal 100 and mobile phones of audiences at the theater may be slave terminals 110. The manager of the theater may request a group service related to ringtone control to the group service server 130 through his/her mobile phone (i.e. the master terminal 100) so as to control the volume of ringtones of the audiences' mobile phones (i.e. the slave terminals 110). In response to the request, the group service server 130 generates a group corresponding to the theater and a group key for the generated group. Then, the group service server 130 receives information of the mobile phones of the audiences at the theater from the plurality of communication network server 120, and registers the group service related to the ringtone control. Thereafter, the group service server 130 transmits the generated group key to the mobile phones of the audiences. The group service server 130 receives contents or programs to be used for the group service from the content provision server 140 and stores the received contents or programs in response to the request of the manager of the theater. Then, the audiences that have received the group key to their mobile phones download the contents or programs from the group service server 130. As the contents or programs related to the group service are downloaded into the mobile phones of the audiences, the manager is able to control the ringtones of the audiences' mobile phones in the theater as being set to mute using his/her mobile phone.

When the movie is over, the ringtones of the audiences' mobile phones return to previous states according to the manager's control, or once the audiences has left the theater or a previously set period of time has elapsed.

Hereinafter, a method and apparatus for providing a group service to the master terminal 100 and the slave terminals 1-N 110 in a wireless communication system will be described in detail.

Figure 2:
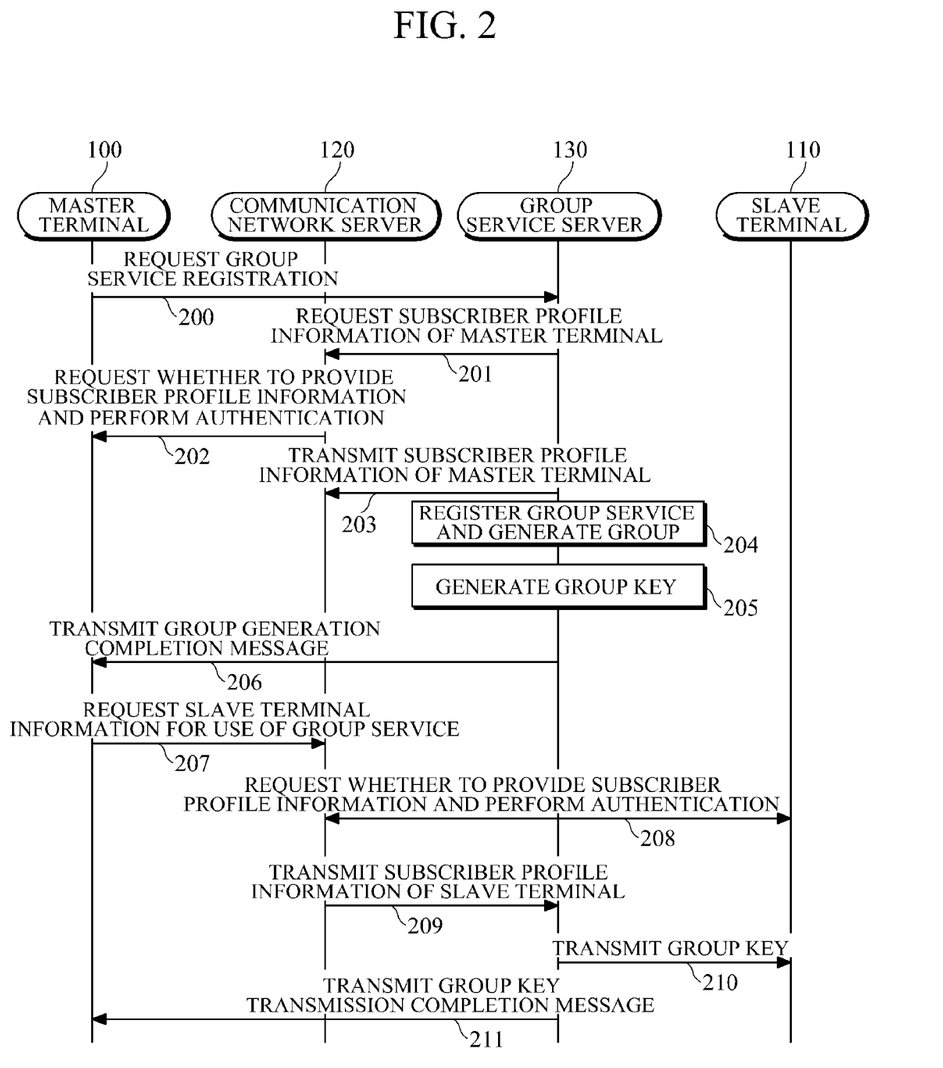
FIG. 2 is a flowchart of an example of a method of registering a group service in a master terminal and a slave terminal by a group service server.

FIG. 2 illustrates a flowchart of an example of a method of registering a group service in a master terminal and a slave terminal by a group service server. Referring to the example shown in FIG. 2, the master terminal 100 transmits group service registration request information to the group service server 130 in response to a group service registration request of a user (200). The group service server 130 that has received the group service registration request information requests subscriber profile information of the master terminal 100 to the communication network server 120 (201). Here, the communication network server 120 is operable for data communication with the master terminal 100. The communication network server 120 stores the subscriber profile information, location information, multicast/broadcast service information and terminal information of the master terminal 100. The communication network server 120 performing data communication with the master terminal 100 may also perform data communication with the slave terminal 110 as well. In this case, the communication network server 120 may have previously stored subscriber profile information of the slave terminal 110 as well as the subscriber profile information of the master terminal 100. That is, the master terminal 100 and the slave terminal 110 may be connected to the same communication network associated with one communication network server 120 or different communication networks associated with several communication network servers 120, thereby performing data communication with the connected communication network server(s) 120.

In response to receiving the request of the subscriber profile information of the master terminal 100 from the group service server 130, the communication network server 120 queries to the master terminal 100 whether to provide the subscriber profile information to the group service server 130. Then, the communication network server 120 receives an authentication response message from the master terminal 100 that authenticates the provision of the subscriber profile information (202). In response to receiving the authentication response message, the communication network server 120 transmits the subscriber profile information of the master terminal 100 to the group service server 130 (203). However, the operations related to the provision of the subscriber profile information of the master terminal 100 are not limited to the above, and when the master terminal 100 may entrust the communication network server 120 with the provision of its subscriber profile information, the communication network server 120 may directly transmit the subscriber profile information of the master terminal 100 to the group service server 130 without performing operation 202.

Then, the group service server 130 takes reference to the received subscriber profile information of the master terminal 100 to register the master terminal for use of a group service and generate a group to use the group service and a group key related to the generated group (204 and 205). Here, the group key is generated by the group service server 130 and is provided to the master terminal 100 and the slave terminal 110. The group key is utilized to register and release the corresponding group and to install and remove contents or programs used for the group service related to the corresponding group. The group key provided to the master terminal 100 and the slave terminal 110 may be updated, changed, or deleted according to a previously set condition.

In response to generating the group key, the group service server 130 transmits a group generation completion message including the generated group key to the master terminal 100 to notify of the completion of generating the group (206). Once the group generation completion message is received, the master terminal 100 requests the subscriber profile information of the slave terminal 110 associated with the master terminal 100 to the communication network server 120 (207). For example, the master terminal 100 may request to the communication network server 120 the subscriber profile information of the slave terminal 110 within an area related to the generated group. In response to the request of the subscriber profile information of the slave terminal 110 from the master terminal 100, the communication network server 120 queries to the slave terminal 110 whether to provide the subscriber profile information. Then, the communication network server 120 receives an authentication response message from the slave terminal 110 that authenticates the provision of the subscriber profile information (208). In response to receiving the authentication response message, the communication network server 120 transmits the subscriber profile information of the slave terminal 110 to the group service server 130 (209). However, the operations related to the provision of the subscriber profile information of the slave terminal 110 are not limited to the above, and when the slave terminal 110 entrusts the communication network server 120 with the provision of its subscriber profile information, the communication network server 120 may directly transmit the subscriber profile information of the slave terminal 110 to the group service server 130 without performing operation 208.

In response to receiving the subscriber profile information of the slave terminal 110 from the communication network server 120, the group service server 130 stores the received subscriber profile information of the slave terminal 110. Thereafter, the group service server 130 takes reference to the received subscriber profile information to transmit the generated group key to the slave terminal 110 (210). Upon transmitting the generated group key to the slave terminal 110, the group service server 130 transmits a group key transmission completion message to the master terminal 100 to inform of the completion of transmitting the group key (211). Accordingly, the registration of the master terminal 100 and the slave terminal 110 for use of the group service provided by the group service server 130 is completed, and thereby the master terminal 100 and the slave terminal 110 are allowed to use the group service. Hereinafter, a method of setting up an ad-hoc network between the master terminal 100 and the slave terminal for use of the group service provided by the group service server will be described in detail.

Figure 3:
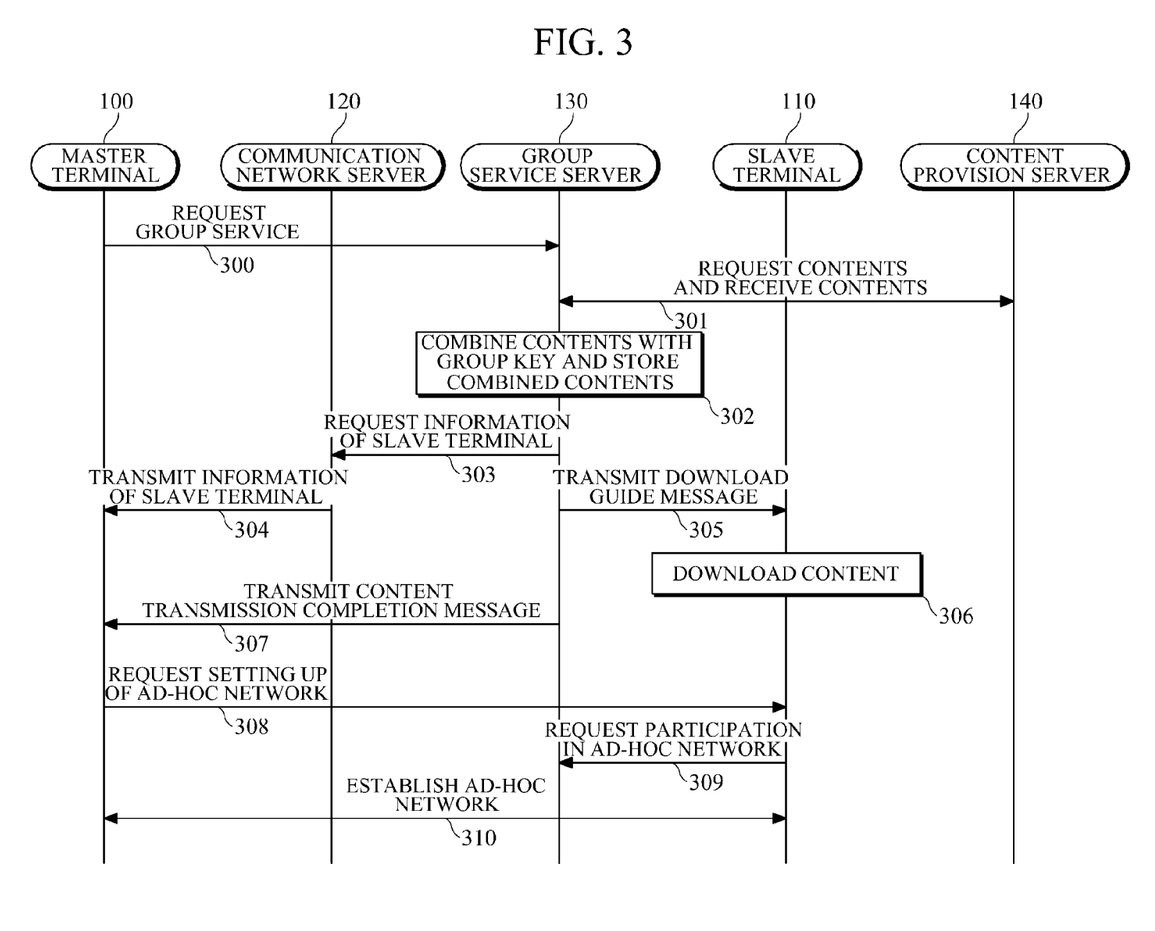
FIG. 3 is a flowchart of an example of a method of providing a group service to a master terminal and a slave terminal.

FIG. 3 illustrates a flowchart of an example of a method of providing a group service to a master terminal and a slave terminal.

As shown in the example, in response to receiving the group generation completion message from the group service server 130, the master terminal 100 transmits group service request information related to the generated group key to the group service server 130 (300). Here, the group service request information may include a type and details of the service provided to the corresponding group and information of relevant contents. For example, where ringtones of audiences' mobile phones at the theater are controlled in response to the request from a theater manager, a group may refer to a group of the audiences at the theater, and a group service may be a service for providing a pleasant and relaxing atmosphere for the audiences to enjoy the movie. In addition, the type and details of the service may be the control of ringtones of the audiences' mobile phones, and the content information may include contents for use of the group service related to the control of mobile phone ringtones.

In response to receiving group service request information, the group service server 130 requests the content provision server 140 to transmit contents corresponding to the group service request information and receives the contents from the content provision server 140 (301). The group service server 130 that has received the contents from the content provision server 140 combines the received contents with the previously generated group key according to a previously defined condition, and stores the combination of the contents and the group key in its database (302). At this time, the group service server 130 may combine information of valid duration of the contents with the group key. When the combination of the group key, the valid duration information and the contents is stored in the database, the group service server 130 transmits a download guide message to the slave terminal 110 dependent on the master terminal 100 to inform how to download the contents combined with the group key and the valid duration information. Here, the slave terminal 110 has received a group key from the content provision server 130 for use of the group service. The group service server 130 requests the communication network server 120 associated with the master server 100 to send terminal information of the slave terminal 110 to transmit the download guide message to the slave terminal 110 for downloading the contents combined with the group key and the valid duration information.

In one example, the group service server 130 requests the communication network server 120 to send the terminal information of the slave terminal 110 within an area under control of the master terminal 100. In response to the request, the communication network server 120 transmits the terminal information of the slave terminal 110 in the area under control of the master terminal 100 to the group service server 130 (303). That is, the communication network server 120 may store the subscriber profile information, location information, multicast/broadcast service information and terminal information of the associated master terminal 110 and/or the slave terminal 110. Therefore, the communication network server 120 is allowed to transmit the terminal information of the slave terminal 110 within the area under control of the master terminal 100 to the group service server 130. The communication network server 120 transmits to the master terminal 100 the terminal information of the slave terminal 110 which has been transmitted to the group service server 130 (304).

In the meantime, the group service server 130 takes reference to the received terminal information of the slave terminal 110 to transmit the download guide message to the slave terminal 110 for downloading the contents combined with the group key and valid duration information (305). Here, the download guide message may include location information of the contents previously stored in the database of the group service server 130. In response to receiving the download guide message, the slave terminal 110 accesses the group service server 130. Once the slave terminal 110 succeeds in accessing the group service server 130, the slave terminal 110 downloads the contents combined with the group key and the valid duration information using the location information contained in the download guide message. Thereafter, the slave terminal 110 activates the downloaded contents using the group key provided from the group service server 130 (306). To be specific, when the download is completed, the slave terminal 110 checks whether the group key combined with the downloaded contents is identical to the group key provided from the group service server 130. If the two group keys are the same, the slave terminal 110 activates the downloaded contents.

When the slave terminal 110 activates the contents, the group service server 130 transmits a content download completion message to the master terminal 100 side (308). In response to receiving the content download completion message, the master terminal 100 takes reference to the terminal information received at 304 to request the corresponding slave terminal 110 to set up an ad-hoc network (308). In response to the ad-hoc network setting request, the slave terminal 110 requests the group service server 130 to participate in the ad-hoc network (309). Consequently, an ad-hoc network is built between the master terminal 100 and the slave terminal 110, thereby allowing the master terminal 100 and the slave terminal 110 to use the group service provided by the group service server 130 (310). Hereinafter, a method of controlling the slave terminal 110 by the master terminal 100 using the group service will be described in detail.

Figure 4:
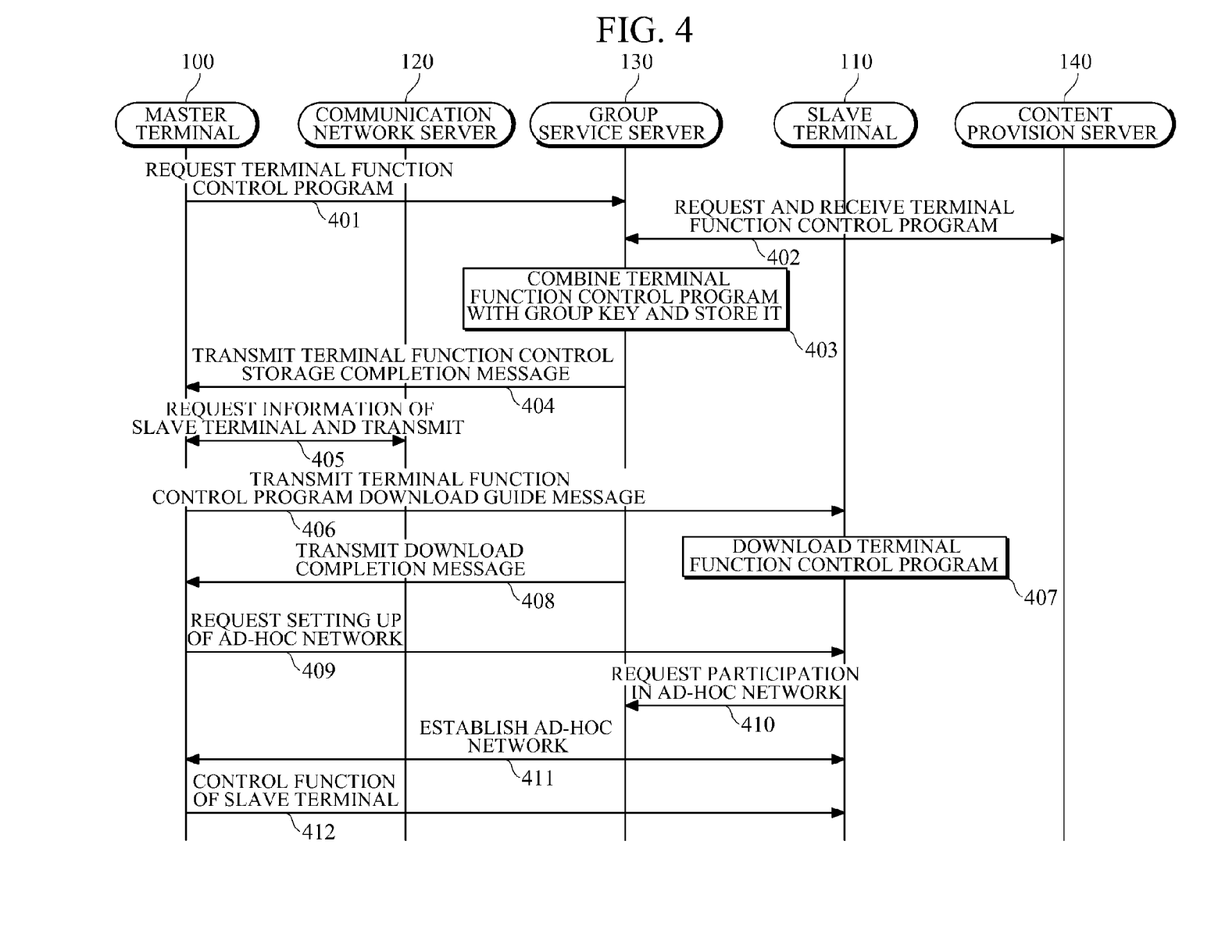
FIG. 4 is a diagram illustrating an example of a flowchart of a method of controlling a function of a slave terminal by a master terminal.

FIG. 4 illustrates an example of a flowchart of a method of controlling a function of a slave terminal by a master terminal. As shown in the example illustrated in FIG. 4, since the group service server 130 forms a specific group and the master terminal 100 and the slave terminal 110 in the formed group are allowed to use a group service, the master terminal 100 can control the function of the slave terminal 110 that uses the same group service as the master terminal 100 in the same group.

First, the master terminal 100 transmits terminal function control program request information to the group service server 130 to control the slave terminal 110 that is able to use the group service in the corresponding group (401). For example, a theater manager may transmit to the group service server 130, using his/her mobile phone (i.e. the master terminal), terminal function control program request information that is related to the control of a ringtone of a mobile phone (i.e. the slave terminal) of each audience at the theater. Here, the mobile phones of the theater manager and the audiences may be previously registered in the group service server 130 for use of the group service. That is, the theater manager and the audiences in the theater have received a group key related to the group service from the group service server 130 and stored it in their mobile phones already.

Upon receiving the terminal function control program request information from the master terminal, the group service server 130 requests the content provision server 140 to send a terminal function control program according to the request from the master terminal 100 and receives the terminal function control program (402). Here, the operation of the content provision server 140 is already described in detail above, and thus the description will not be reiterated. Once the terminal function control program is received from the content provision server 140, the group service server 130 combines the received terminal function control program, the group key provided to the master terminal 100, and valid duration information of the program, and stores the resultant combination in an internal database (403). Then, the group service server 130 transmits a terminal function control program storage completion message to the master terminal (404). The master terminal 100 which has received the terminal function control program storage completion message requests the communication network server 120 to send terminal information of the slave terminal 110 dependent on the master terminal 100. The communication network server 120 transmits the terminal information of the corresponding slave terminal 110 to the master terminal 100 (405). In one example, the master terminal 100 may request the communication network server 120 to transmit terminal information of the slave terminal 110 within an area under control of the master terminal 100. Accordingly, the communication network server 120 transmits the terminal information of the corresponding slave terminal to the master terminal 100. That is, the communication network server 120 that transmits the terminal information of the slave terminal 110 to the master terminal 100 may store the subscriber profile information, location information, multicast/broadcast service information and terminal information of the associated master terminal 110 and/or the slave terminal 110. The master terminal 100 that has received the terminal information of the slave terminal 110 from the communication network server 120 takes reference to the received terminal information to transmit a terminal function control program download guide message to the slave terminal 110 (406). The terminal function control program download guide message may include location information of a terminal function control program previously stored in the database of the group service server 130. In response to receiving the terminal function control program download guide message, the slave terminal 110 accesses the group service server 130. With the access to the group service server 130, the slave terminal 110 downloads the terminal function control program combined with the group key and the valid duration information by use of the location information contained in the terminal function control program download guide message. Then, the slave terminal 110 uses the group key provided from the group service server 130 to activate the downloaded terminal function control program (407). That is, once the download of the terminal function control program is completed, the slave terminal 110 checks whether the group key combined with the downloaded terminal function control program is identical to the group key provided from the group service server 130. If the two group keys are the same, the slave terminal 110 activates the downloaded contents.

When the slave terminal 110 activates the terminal function control program, the group service server 130 accordingly transmits the terminal function control program download completion message to the master terminal 110 (408). Upon receiving the terminal function control program download completion message, the master terminal 100 takes reference to the terminal information of the slave terminal 110 acquired at operation 405 to request the corresponding slave terminal 110 to set up an ad-hoc network (409). In response to the ad-hoc network set up request, the slave terminal 110 requests the group service server 130 to participate in the ad-hoc network (410). Consequently, the ad-hoc network is built between the master terminal 100 and the slave terminal 110 (411). With the establishment of the ad-hoc network between the master terminal 100 and the slave terminal 110, the master terminal 100 is allowed to control the function of the slave terminal 110 belonging to the ad-hoc network.

Hereinafter, a group service providing apparatus that provides a group service to the master terminal 100 and the slave terminal 110 will be described in detail.

Figure 5:
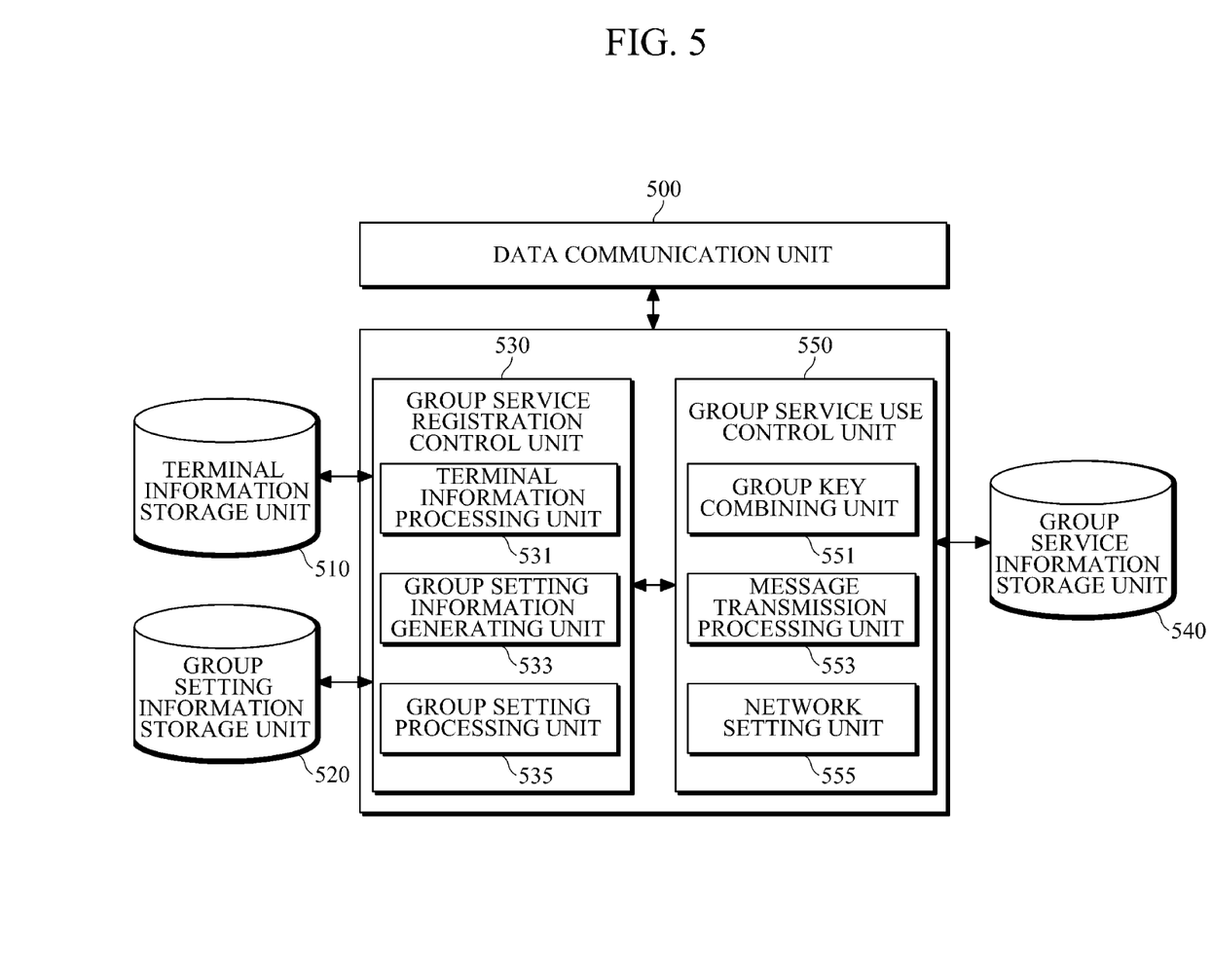
FIG. 5 is a diagram illustrating an example of a group service providing apparatus for providing a group service.

FIG. 5 illustrates an example of a group service providing apparatus for providing a group service. As shown in the example illustrated in FIG. 5, the group service providing apparatus includes a data communication unit 500, a terminal information storage unit 510, a group setting information storage unit 520, and a group service registration control unit 530. The data communication unit 500 performs group service-related data communications with the master terminal 100, the slave terminal 110, the communication network server 120, and the content provision server 140. The operations of the master terminal 100, the slave terminal 110, the communication network server 120, and the content provision server that performs the group service-related data communications with the group service providing apparatus through the data communication unit 500 are described above, and thus the detailed description will not be reiterated.

The terminal information storage unit 510 stores the terminal information and subscriber profile information of each of the master terminal 100 and the slave terminal 110. The group setting information storage unit 520 stores a group key for a generated group and a group service to be provided to the generated group. In response to receiving a group service registration request from the master terminal 100 through the data communication unit 500, the group service registration control unit 530 generates a group key for use of the requested group and a group service relevant to the requested group. Once the group and the group key are generated, the group service registration control unit 530 transmits the generated group key to the master terminal 100 and the slave terminal 110 dependent on the master terminal 100. The group service registration control unit 530 may be configured to include a terminal information processing unit 531, a group setting information generating unit 533, and the group setting processing unit 535.

The terminal information processing unit 531 stores, in the terminal information storage unit 510, the terminal information and the subscriber profile information of each of the master terminal 100 and the slave terminal 110 which are received through the communication network server 120 associated with each of the master terminal 100 and the slave terminal 110. In one example, the terminal information processing unit 531 may store in the terminal information storage unit 510 the terminal information and subscriber profile information of the master terminal 100 received through the communication network server 120 associated with the master terminal 100. In addition, the terminal information processing unit 531 may store in the terminal information storage unit 510 the terminal information and subscriber profile information of the slave terminal 110 received through the communication network server 120 associated with the slave terminal 110 within the area under control of the master terminal 100. The communication network server 120 that provides the information of the master terminal 100 or the slave terminal 110 may store the subscriber profile information, location information, multicast/broadcast service information, and terminal information of the master terminal 100 and/or the slave terminal 110. When receiving the terminal information and subscriber profile information of the master terminal 100 and the slave terminal 110, the terminal information processing unit 531 stores in the terminal information storage unit 510 the received terminal information and subscriber profile information of the master terminal 100 and the slave terminal 110.

In response to receiving a group service registration request from the master terminal 100 through the data communication unit 500, the group setting information generating unit 533 generates a group key for use of a requested group and a group service relevant to the requested group. The group key for use of the group service allows registration and release of a corresponding group and installation and removal of contents and programs used for the group service for the corresponding group. The group key may be updated, changed and deleted according to conditions previously set by the master terminal 100 or the group service providing apparatus.

The group setting processing unit 535 stores in the group service information storage unit 520 the group and group key generated by the group setting information generating unit 533. In addition, the group setting processing unit 535 takes reference to the pieces of terminal information of the terminals stored in the terminal information storage unit 510 to transmit the generated group key to the master terminal 100, which has issued the group service registration request, and the slave terminal 110 dependent on the master terminal 100. In one example, the slave terminal 110 dependent on the master terminal 100 may be located within an area under control of the master terminal 100. When the slave terminal 110 and the master terminal 100 have received the group key, the group setting processing unit 535 transmits information of a result of processing the group key transmission to the master terminal 100. Accordingly, the registration of the master terminal 100 and the slave terminal 110 for use of the group service can be performed. Once the registration for the use of the group service is completed, the group service providing apparatus provides the master terminal 100 and the slave terminal 110 with the group service using a group service information storage unit 540 and a group service use control unit 550.

The group service information storage unit 540 stores contents related to a group service use request from the master terminal 100 or a terminal function control program for control of the slave terminal 110. In response to receiving group service use request information from the master terminal 100 through the data communication unit 500, the group service use control unit 550 receives contents corresponding to the group service use request information or the terminal function control program for the slave terminal 110 from the content provision server 140 and stores the received contents or terminal function control program in the group service information storage unit 540. In addition, the group service use control unit 550 controls the contents or the terminal function control program to be downloaded to the slave terminal 110 dependent on the master terminal 100. The group service use control unit 550 may be configured to include a group key combining unit 551, a message transmission processing unit 553, and a network setting unit 555.

The group key combining unit 551 combines the contents from the content provision server 140 or the terminal function control program for the slave terminal 110 with a group key and stores the combined contents or program in the group service information storage unit 540. Here, the group key is the same as the group key that is provided to the master terminal 100 and the slave terminal 110 dependent on the master terminal 100. The group key combining unit 551 may further combine valid duration information of the received contents or valid duration information of the terminal function control program with the contents or the program and store the combined contents or program in the group service information storage unit 540.

The message transmission processing unit 553 transmits a download guide message to the master terminal 100 or the slave terminal 110 such that the contents or terminal function control program combined with the group key and stored in the group service information storage unit 540 by the group key combining unit 551 can be downloaded. Here, the download guide message may contain location information of the contents or program function control program stored in the group service information storage unit 530 of the group service providing apparatus.

In one example, in response to receiving a request for a group service related to contents from the master terminal 100 through the data communication unit 500, the message transmission processing unit 553 takes reference to the terminal information of each terminal stored in the terminal information storage unit 510 to transmit the content download guide message to the slave terminal 110 dependent on the master terminal 100. In another example, in response to receiving a terminal function control program request from the master terminal 100 through the data communication unit 500, the message transmission processing unit 553 transmits a terminal function control program download guide message to the requested master terminal 100. Thus, the master terminal 100 can transmit the terminal function control program download guide message to the slave terminal 110 dependent on the master terminal 100.

When the content download guide message or the terminal function control program download guide message is transmitted to the slave terminal 110 and accordingly the slave terminal 110 downloads the contents or the terminal function control program from the group service information storage unit 530, the network setting unit 555 controls an ad-hoc network to be established between the master terminal 100 and the slave terminal 110.

That is, when receiving the content related group service request from the master terminal 100, the group key combining unit 551 receives contents corresponding to the received request from the content provision server 140. Then, the group key combining unit 551 combines the received contents with the group key provided to the master terminal 100 and the valid duration information of the contents according to previously defined conditions, and stores the combined contents in the group service information storage unit 530. Thereafter, the message transmission processing unit 553 transmits to the slave terminal 110 dependent on the master terminal 100 a content related download guide message for downloading the contents from the group service information storage unit 530. The slave terminal 110 dependent on the master terminal 100 may be, for example, a terminal located within an area under control of the master terminal 100. When the contents is downloaded to the slave terminal 110 from the group service information storage unit 530, the network setting unit 555 transmits a content transmission completion message to the master terminal 100. Then, the master terminal 100 requests the dependent slave terminal 110 to set up an ad-hoc network therebetween, and in response to the request, the slave terminal 110 requests the group service providing apparatus to participate in the ad-hoc network. Accordingly, the network setting unit 555 sets up the ad-hoc network between the master terminal 100 and the slave terminal 110 that issues the request to the group service providing apparatus, thereby establishing the ad-hoc network between the master terminal 100 and the slave terminal 110. Thus, the master terminal 100 and the slave terminal 110 are allowed to use the group service provided by the group service providing apparatus.

Alternatively, when receiving a request for a group service related to a terminal function control program from the master terminal 100, the group key combining unit 551 receives the terminal function control program corresponding to the request of the mater terminal 100 from the content provision server 140. Then, the group key combining unit 551 combines the received terminal function control program with the group key provided to the master terminal 100 and the valid duration information of the terminal function control program according to previously defined conditions, and stores the combined program in the group service information storage unit 530. Thereafter, the message transmission processing unit 553 transmits a terminal function control program download guide message to the master terminal 100 for downloading the terminal function control program from the group service information storage unit 530. Accordingly, the master terminal 100 transmits the terminal function control program download guide message to the dependent slave terminal 110. The slave terminal 110 dependent on the master terminal 100 may be, for example, a terminal that is located within an area under control of the master terminal 100. When, the slave terminal 110 downloads the terminal function control program stored in the group service information storage unit of the group service providing apparatus, the network setting unit 555 transmits a terminal function control program transmission completion message to the master terminal 100. Then, the master terminal 100 requests the dependent slave terminal 110 to set up an ad-hoc network therebetween, and in response to the request, the slave terminal 110 requests the group service providing apparatus to participate in the ad-hoc network. Then, the network setting unit 555 sets the ad-hoc network between the master terminal 100 and the slave terminal 110 that issues the request to the group service providing apparatus, thereby establishing the ad-hoc network between the master terminal 100 and the slave terminal 110. Thus, the master terminal 100 is allowed to control terminal functions of the dependent slave terminal 110.

As described above, the group service providing method and the group service providing apparatus suitable for a wireless communication system may provide a user-oriented group service in various wireless communication networks. That is, the group service server may form or release a group of wireless terminals that utilize various wireless communication networks, and manage contents per group. In addition, the group service server controls functions of individual wireless terminals, thereby allowing users to effectively use the user-oriented group service by use of the group key provided from the group service server to users' wireless terminals.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A group service providing method for providing a group service to a master terminal and a slave terminal which are provided with a group key from a group service server for use of the group service, the group service providing method comprising:
   in response to receiving a group service request from the master terminal, receiving contents related to the group service request from a content provision server, wherein the group service request comprises a request for a group service involving the master terminal controlling a function of the slave terminal, and wherein the received contents comprise a terminal function control program;
   combining the received contents with the group key and valid duration information of the contents and storing the combined contents;
   transmitting a content download guide message to the slave terminal for downloading the contents combined with the group key with reference to terminal information of the slave terminal received from a communication network server associated with the master terminal; and
   in response to receiving an ad-hoc network participation request from the slave terminal that has downloaded the contents combined with the group key according to the content download guide message, setting up an ad-hoc network between the master terminal and the slave terminal that has received the combined contents, wherein the ad-hoc network enables the master terminal to control the function of the slave terminal.

2. The group service providing method of claim 1, wherein the communication network server stores subscriber profile information, multicast-/broadcast information and terminal information of each of the master terminal and the slave terminal.

3. The group service providing method of claim 1, wherein the receiving of the contents comprises:
   receiving terminal function control program request information from the master terminal;
   requesting the content provision server to transmit the terminal function control program related to the terminal function control program request information; and
   receiving the terminal function control program from the content provision server.

4. The group service providing method of claim 3, wherein the terminal function control program request information comprises a service type, service details, and corresponding content information of the group service, and the content download guide message comprises location information of the group key-combined contents stored in the group service server.

5. The group service providing method of claim 1, wherein the transmitting of the content download guide message comprises:
   requesting the communication network server to transmit the terminal information of the slave terminal dependent on the master terminal;
   receiving the terminal information of the slave terminal from the communication network server; and
   transmitting the content download guide message to the slave terminal with reference to the received terminal information of the slave terminal, and transmitting a content download completion message to the master terminal.

* * * * *